Nov. 23, 1926.
C. A. WETZELL
1,608,450
METHOD OF PRODUCING MONOGRAMS AND DESIGNS
Filed Sept. 18, 1925
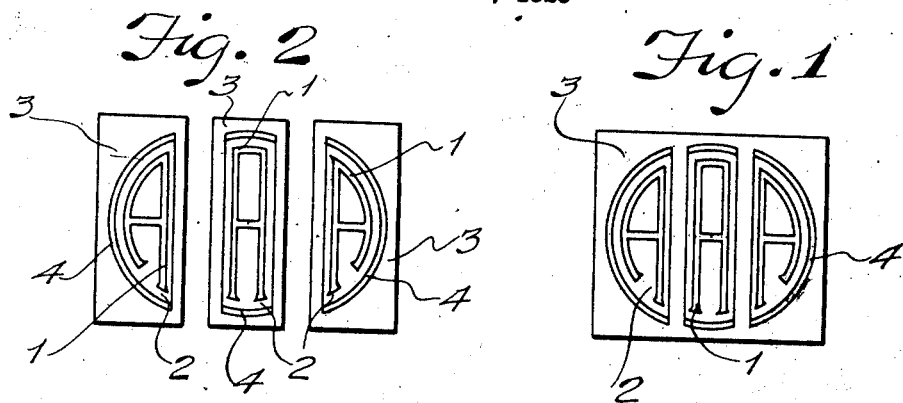
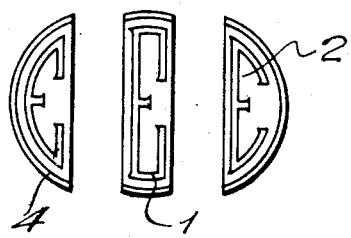
CLARE A. WETZELL
INVENTOR
BY Victor J. Evans
ATTORNEY Patented Nov. 23, 1926.

1,608,450

UNITED STATES PATENT OFFICE.

CLARE A. WETZELL, OF STERLING, ILLINOIS.

METHOD OF PRODUCING MONOGRAMS AND DESIGNS.

Application filed September 18, 1925. Serial No. 57,184.

This invention relates to new and useful improvements in methods for transferring decalcomania designs and insignia. The main objct of my invention is the provision of a novel method for transferring groups of letters from a carrying member onto an object upon which it is desired to arrange the characters in groups so as to present the appearance of hand work.

Another object of my invention is the provision of a method of the above character wherein the various letters of the alphabet are duplicated and are arranged in groups or series, similar letters being grouped together so as to readily be selected and transferred and rearranged so as to be disposed in matching relation for forming a monogram.

A further object of my invention is to provide a manner of forming each letter of the alphabet in various predetermined shapes whereby selected letters of the alphabet may be readily grouped together and matched to form a predetermined design of monogram.

With the above and other objects in view, my invention consists in the novel features of construction and in the combination and arrangement of parts to be hereinafter more fully described, pointed out in the claims and shown in the accompanying drawings, in which:

Fig. 1 is a plan view of a series of one letter as produced in practice,

Fig. 2 is a plan view illustrating one series of letters separated or cut apart, Fig. 3 is a similar view illustrating a series of another letter of the alphabet, Fig. 4 is a similar view illustrating a series of still another letter of the alphabet, and Fig. 5 is a plan view of a monogram showing how the letters may be grouped in predetermined arrangement and matched to form a predetermined design.

The drawings illustrate the method of producing a monogram consisting of the letters ADE arranged in a circular design. The great majority of monograms consist of three letters and I have therefore illustrated the letters to be used in my method as being printed in groups of series of three. The letters 1 are each printed separately upon a base or background 2 and mounted on a supporting sheet 3 of paper in a manner known in the production of decalcomania.

Preferably, though not necessarily, the letters and the backgrounds thereof are separately spaced a slight distance apart for convenience in handing and are attached to sheet 3 by an adhesive, as is known.

In the present instance it is assumed that it is desired to produce a monogram of circular design or outline. With this object in view, the central letter of each series and its base or background is shaped to provide the central portion or segment of the circle to be formed, the terminal letters of each series and their backgrounds or segments of the circles, form the outside portions or segments of the circle. After the series of the letters required for the desired design have been selected, the letters of each series are then severed or cut apart as illustrated in Figs. 2, 3 and 4 and the proper letter from each series is selected to form the desired monogram and design. In this instance, the left hand one, as considered in the drawings, of the series of A letters is selected, and the central one of the series of D letters and the right hand one of the series of E letters. These three selected letters and the bases or backgrounds thereof, when arranged with the inner edges of the bases or backgrounds of the terminal letters abutting the edges of the base or background of the central letter will produce the desired monogram having the desired shape or design.

After the proper letters have been selected from the several series, they are immersed in water for a short period of time sufficient to effectually loosen the bases or backgrounds from the supporting strip of paper 3. The strips 3 bearing the letters are then successively placed closely adjacent the surface where it is desired to apply the monogram and the letters are slid off the paper strips and assembled to form the monogram, as illustrated in Fig. 5, after which they are pressed firmly into position with a clean piece of blotting paper. The monogram thus produced quickly dries and adheres firmly to the surface to which applied forming a monogram of great permanency and striking appearance. To enhance the appearance of each completed monogram, the base or background of each letter may be provided with a fine line or stripe 4 adjacent and concentric with its outer peripheral edge, these stripes or lines registering with each other in the completed design to form a circular frame enclosing the monogram.

By printing or arranging the letters in series, each letter in each series bearing a definite relation to the monogram or design to be formed, it is possible to produce monograms of unusually striking and artistic appearance which, when completed, can not be distinguished from hand painted monograms and which cost but a very small fraction of the cost of hand painted ones. It is also possible, by my method, to produce monograms having color schemes and effects of unusual and striking beauty such as could not be produced by hand except by artists of unusual skill, in which case the cost would be prohibitive. My method is intended more particularly for use in small work, such as applying monograms to automobiles, in which field it has met with unusual success, though it may be used for many other purposes. While I have illustrated and described my method as used in connection with a monogram or design of circular outline, it will be understood that it may be also used for producing designs of many other geometrical figures, the characters to be used being printed in groups or series, and each character of each series bearing a definite relation to the figure or design to be produced. I do not, therefore, desire to limit myself to the specific arrangement illustrated and described and intend to include in this application all such variations as fall within the scope of the appended claims.

What I claim is:

1. A method of producing monograms of predetermined shapes; consisting in printing the characters to be used in separate series on bases permanently associated with and projecting beyond the outline of the respective characters, the characters of each series being similar and each character forming with its base a different portion of the monogram to be produced, selecting from different series of characters the characters to be used in the monogram, and then assembling the selected characters and securing them on a supporting surface with the edges of the bases of the characters in matched relation and forming the outline and background of the desired monogram.

2. A method of forming designs of predetermined shapes by the decalcomania process, consisting in printing the figures to be used and arranging them in separate series, each series forming the outline of the design to be formed and the figures of each series being similar and each forming a different part of the design to be formed, separating the figures of the several series of the figures to be used in the design, selecting from the separated figures those figures which will produce the design when assembled in matched relation, and then securing the selected figures on a supporting surface in matched relation forming the design.

3. A method of forming monograms of predetermined shapes, consisting in printing the letters of the alphabet in multiple on suitable bases and securing them by an adhesive on a sheet of absorbent material, the letters being arranged in series and the letters of each series being similar, each series of letters forming the desired design and each letter of each series forming a different part of the desired design, selecting the several series of the letters to be used in the monogram, separating the letters of the selected series by cutting the sheet of material between the letters, selecting from the separated letters those letters which when assembled in matched relation will produce the desired monogram and design, immersing the selected letters in water a sufficient length of time to dissolve the adhesive sufficiently to permit of the letters being readily slid off of the pieces of absorbent material on which they are mounted, and then sliding the letters onto the surface to which they are to be applied and arranging them thereon in matched relation forming the desired monogram and design, the adhesive remaining on the letters acting to secure them permanently to such surface.

4. As a new article of manufacture, a decalcomania for producing monograms comprising a base element and a character printed thereon, the base element being permanently associated with and extending beyond the outline of the character and forming a portion of the outline and background of the monogram to be produced, the base member also facilitating positioning of the character in proper matched relation to other characters provided with base members forming other parts of and completing the outline and background of the monogram.

5. As a new article of manufacture, a decalcomania for producing monograms comprising a series of similar characters each having permanently associated therewith a base element projecting beyond the outline of the character, the characters of the series and their associated base elements forming the outline and background of the monogram to be produced, each character and its base element forming a different portion of the outline and background of the monogram.

In testimony whereof I affix my signature.

CLARE A. WETZELL.